(12) United States Patent
Garry (10) Patent No.: US 10,819,719 B2
(45) Date of Patent: Oct. 27, 2020

(54) SYSTEMS AND METHODS FOR PROTECTING A PHYSICAL ASSET AGAINST A THREAT

(71) Applicant: General Electric Company, Schenectady, NY (US)

(72) Inventor: Robert Scott Garry, Greenville, SC (US)

(73) Assignee: General Electric Company, Schenectady, NY (US)

( * ) Notice: Subject to any disclaimer, the term of this patent is extended or adjusted under 35 U.S.C. 154(b) by 132 days.

(21) Appl. No.: 15/290,306

(22) Filed: Oct. 11, 2016

(65) Prior Publication Data
US 2018/0103049 A1    Apr. 12, 2018

(51) Int. Cl.
*H04L 29/06*    (2006.01)
*G06F 21/55*    (2013.01)
(Continued)

(52) U.S. Cl.
CPC ........ *H04L 63/1425* (2013.01); *G06F 21/554* (2013.01); *H04L 63/1416* (2013.01);
(Continued)

(58) Field of Classification Search
CPC combination set(s) only.
See application file for complete search history.

(56) References Cited

U.S. PATENT DOCUMENTS 4,969,576 A * 11/1990 Merrill ................. B67D 1/0857
222/1
5,864,781 A * 1/1999 White .................... A01B 63/00
700/1
(Continued)

FOREIGN PATENT DOCUMENTS

WO    WO-2015084219 A1 *  6/2015 .............. F42B 39/14
WO       2016/055939 A1    4/2016

OTHER PUBLICATIONS

Chiou et al., "Dispatchable Renewable Energy Model for Microgrid Power System", 2016 IEEE Conference on Technologies for Sustainability, 978-1-5090-4158-9/16, (Year: 2016).*

(Continued)

*Primary Examiner* — Piotr Poltorak
(74) *Attorney, Agent, or Firm* — Eversheds Sutherland (US) LLP (57) ABSTRACT

Embodiments of the disclosure relate to systems and methods for protecting a physical asset against an attack. In one exemplary embodiment, an asset protection system is configured to use a monitoring system to obtain performance parameters of a physical asset when the physical asset is in operation. The asset protection system is further configured to retrieve from a database, one or more threat signatures and to use the one or more threat signatures to detect an attack upon the physical asset, the detection based at least in part on identifying a relationship between at least one of the threat signatures and at least a portion of the performance parameters of the physical asset. When an attack is detected, a signal can be transmitted to a control system of the physical asset and/or directly to the physical asset, to modify an operation of the physical asset in response to the attack.

20 Claims, 5 Drawing Sheets

(51) Int. Cl.
   *G05B 23/02* (2006.01)
   *G05B 19/042* (2006.01)
   *H04L 29/08* (2006.01)

(52) U.S. Cl.
   CPC ...... *G05B 19/0428* (2013.01); *G05B 23/0208* (2013.01); *G05B 23/0229* (2013.01); *G05B 2219/50185* (2013.01); *H04L 67/125* (2013.01)

(56) References Cited

U.S. PATENT DOCUMENTS

| | | | | |
|---|---|---|---|---|
| 6,022,138 | A * | 2/2000 | Sonander | G01N 25/68 374/28 |
| 7,356,832 | B1 * | 4/2008 | Eibach | B60R 25/00 701/31.4 |
| 7,472,417 | B2 * | 12/2008 | Gerlach | G05B 19/4184 713/154 |
| 9,311,487 | B2 * | 4/2016 | Unagami | H04L 9/085 |
| 9,619,671 | B2 * | 4/2017 | Berger | G06F 21/70 |
| 9,697,355 | B1 * | 7/2017 | Park | G06F 21/552 |
| 9,923,832 | B2 * | 3/2018 | Wetterwald | H04L 47/2441 |
| 10,281,166 | B1 * | 5/2019 | Hutz | H04L 63/0428 |
| 10,718,200 | B2 * | 7/2020 | Coste | F04D 15/0077 |
| 2002/0055826 | A1 * | 5/2002 | Wegerich | G06F 17/10 703/2 |
| 2002/0156568 | A1 * | 10/2002 | Knott | G01M 15/102 701/114 |
| 2003/0214305 | A1 * | 11/2003 | Von Wendorff | G05B 19/0428 324/500 |
| 2004/0059510 | A1 * | 3/2004 | Thompson, Jr. | E21B 41/0021 702/6 |
| 2004/0166818 | A1 * | 8/2004 | Karlsson | H04W 99/00 455/115.1 |
| 2005/0096806 | A1 * | 5/2005 | Diem | G01N 27/4175 701/31.4 |
| 2005/0267702 | A1 * | 12/2005 | Shah | G05B 23/0229 702/81 |
| 2005/0281291 | A1 * | 12/2005 | Stolfo | G06F 21/552 370/506 |
| 2007/0067114 | A1 * | 3/2007 | D'Amato | F01D 21/003 702/34 |
| 2007/0088528 | A1 * | 4/2007 | Miller | G05B 23/024 702/185 |
| 2007/0214797 | A1 * | 9/2007 | Bland | F01D 21/003 60/772 |
| 2008/0126043 | A1 * | 5/2008 | Holtz | F16H 61/143 703/8 |
| 2008/0135203 | A1 * | 6/2008 | Doll | B21B 37/00 164/157 |
| 2008/0209505 | A1 * | 8/2008 | Ghai | G06F 21/55 726/1 |
| 2010/0100927 | A1 * | 4/2010 | Bhola | G06F 21/335 726/1 |
| 2011/0072506 | A1 * | 3/2011 | Law | H04L 63/0227 726/11 |
| 2011/0184575 | A1 * | 7/2011 | Kawamoto | G06Q 50/06 700/292 |
| 2011/0210548 | A1 * | 9/2011 | Sevenster | F03B 15/00 290/43 |
| 2011/0264240 | A1 * | 10/2011 | Pettigrew | G05B 19/042 700/7 |
| 2012/0083933 | A1 * | 4/2012 | Subbu | G06N 3/02 700/291 |
| 2012/0136541 | A1 * | 5/2012 | Inamoto | B60R 21/0132 701/45 |
| 2012/0159650 | A1 * | 6/2012 | Cho | G06F 21/554 726/34 |
| 2012/0215450 | A1 * | 8/2012 | Ashok | G05B 23/0254 702/9 |
| 2012/0233698 | A1 * | 9/2012 | Watters | G06F 21/554 726/25 |
| 2012/0241464 | A1 * | 9/2012 | Adams | G07F 7/0609 221/120 |
| 2012/0271574 | A1 * | 10/2012 | Williams, Jr. | H02J 13/00002 702/60 |
| 2012/0304007 | A1 | 11/2012 | Hanks et al. | |
| 2013/0031953 | A1 * | 2/2013 | Flanders | G01N 33/0006 73/23.31 |
| 2013/0261988 | A1 * | 10/2013 | Lim | G05B 23/0283 702/39 |
| 2013/0282190 | A1 * | 10/2013 | Conroy | G05B 23/0208 700/286 |
| 2013/0291094 | A1 * | 10/2013 | Sahoo | G06F 21/45 726/19 |
| 2013/0298655 | A1 * | 11/2013 | Kowalkowski | F01N 11/00 73/114.75 |
| 2013/0340084 | A1 | 12/2013 | Schrecker et al. | |
| 2014/0130587 | A1 * | 5/2014 | Von Herzen | G01N 33/2888 73/114.55 |
| 2014/0266682 | A1 * | 9/2014 | Gettings | G08B 23/00 340/517 |
| 2014/0289852 | A1 * | 9/2014 | Evans | G06F 21/55 726/23 |
| 2014/0337495 | A1 * | 11/2014 | Branton | G06F 9/542 709/223 |
| 2014/0365638 | A1 * | 12/2014 | Shah | H04L 41/147 709/224 |
| 2015/0262067 | A1 * | 9/2015 | Sridhara | G06N 5/04 706/12 |
| 2016/0098561 | A1 * | 4/2016 | Keller | G06F 21/554 726/24 |
| 2016/0356751 | A1 * | 12/2016 | Blackley | G01N 33/0036 |
| 2016/0360791 | A1 * | 12/2016 | Blackley | A24F 47/008 |
| 2016/0361972 | A1 * | 12/2016 | Blackley | B60H 3/0035 |
| 2016/0364927 | A1 * | 12/2016 | Barry | H04L 63/08 |
| 2017/0234562 | A1 * | 8/2017 | Ribbich | G05D 23/1923 700/277 |
| 2017/0270295 | A1 * | 9/2017 | Park | G06F 21/552 |
| 2017/0322806 | A1 * | 11/2017 | Malur | G06F 9/3017 |
| 2017/0329966 | A1 * | 11/2017 | Koganti | G06F 21/56 |
| 2018/0041527 | A1 * | 2/2018 | Call | H04L 63/0428 |
| 2018/0372506 | A1 * | 12/2018 | Kupper | G01D 3/0365 |
| 2019/0075025 | A1 * | 3/2019 | McCann | H04B 17/318 |
| 2019/0230106 | A1 * | 7/2019 | Abbaszadeh | G05B 23/0229 |

OTHER PUBLICATIONS

Ciapessoni et al., "Contingency screening starting from probabilistic models of hazards and component vulnerabilities", 2016 Power Systems Computation Conference (PSCC), DOI: 10.1109/PSCC.2016.7540897, INSPEC Accession No. 16227870, Jun. 20-24, 2016, (Year: 2016).*

Hird et al., "Towards Mathematical Modelling in Security Risk Management in System Engineering", 978-1-4673-6253-5/13, (Year: 2013).*

Extended European Search Report and Opinion issued in connection with corresponding EP Application No. 17194644.5 dated Dec. 7, 2017.

* cited by examiner

SYSTEMS AND METHODS FOR PROTECTING A PHYSICAL ASSET AGAINST A THREAT

FIELD OF THE DISCLOSURE

This disclosure relates to protecting a physical asset against a threat, and more particularly, to systems and methods for protecting a physical asset against a software threat.

BACKGROUND OF THE DISCLOSURE

Software intrusions that are aimed at surreptitiously attacking various computer systems have become highly sophisticated and ubiquitous nowadays. Many of these intrusions are carried out by individuals and criminal gangs using malicious software in order to steal data, intellectual property, and/or money. However, in some cases, intrusions can be carried out by government-backed entities in order to wage an unconventional war against various nations and governments. This type of unconventional war can include software intrusions directed at attacking computer systems associated with public utilities, communication networks, and/or security systems in another country.

Regardless of the objective, a software intrusion is typically carried out by planting malware in a computer in order to disable or modify the behavior of the computer and/or to disable or modify the behavior of a computer system via the malware-infected computer. Conventional security systems are designed to detect the presence of such malware and to execute protective measures to protect the computer and/or the computer system.

BRIEF DESCRIPTION OF THE DISCLOSURE

Certain embodiments of the disclosure can provide a technical effect and/or solution for protecting a physical asset against a threat in part by acquiring one or more performance parameters of the physical asset when the physical asset is placed in an operating condition, and for detecting the threat by identifying a relationship between these performance parameters and one or more threat signatures that identify one or more behaviors of the physical asset when subjected to a software intrusion.

According to one exemplary embodiment of the disclosure, a system includes a first physical asset, a control system for controlling the first physical asset, a monitoring system, and an asset protection system. The monitoring system, which is coupled to the first physical asset, can include one or more monitoring devices configured to acquire one or more performance parameters of the first physical asset when the first physical asset is placed in an operating condition. The asset protection system can include a computer configured to obtain from the one or more monitoring devices, at least a portion of the one or more performance parameters of the first physical asset; retrieve from a database, one or more threat signatures; detect a threat to the first physical asset, based at least in part on identifying a relationship between at least one of the one or more threat signatures and the at least a portion of the one or more performance parameters of the first physical asset; and transmit a signal to at least one of the control system or the first physical asset to modify an operation of the first physical asset in response to the threat.

According to another exemplary embodiment of the disclosure, a method includes providing an asset protection system comprising a computer; obtaining in the computer, from a monitoring system, one or more performance parameters of a first physical asset; retrieving from a database, at least one threat signature; detecting a threat to the physical asset, based at least in part on identifying a relationship between the one or more performance parameters of the first physical asset and the at least one threat signature; and modifying an operation of the first physical asset in response to the threat.

According to yet another exemplary embodiment of the disclosure, an asset protection system includes a computer configured to obtain from a monitoring system, at least one performance parameter of a physical asset; retrieve from a database, at least one threat signature; detect a threat to the physical asset, based at least in part on identifying a relationship between the at least one performance parameter of the physical asset and the at least one threat signature; and transmit a signal to at least one of the physical asset or to a controller controlling the physical asset to modify an operation of the physical asset in response to the threat.

Other embodiments and aspects of the disclosure will become apparent from the following description taken in conjunction with the following drawings.

BRIEF DESCRIPTION OF THE DRAWINGS

Having thus described the disclosure in general terms, reference will now be made to the accompanying drawings, which are not necessarily drawn to scale, wherein like numbers refer to like elements throughout.

DETAILED DESCRIPTION OF THE DISCLOSURE

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein; rather, these embodiments are provided so that this disclosure will satisfy applicable legal requirements. More particularly, the word "exemplary" as used herein indicates one among several examples, and it should be understood that no undue emphasis or preference is being directed to the particular example being described. Furthermore, the word "example" as used herein is intended to be non-exclusionary and non-limiting in nature It should also be understood that certain words and terms are used herein solely for convenience and such words and terms should be interpreted as referring to various objects and actions that are generally understood in various forms and equivalencies by persons of ordinary skill in the art. Thus, words such as "threat," "attack," "software attack," and "intrusion" as used herein should be understood to refer to various types of offensive maneuvers that can be employed by individuals or organizations to harm physical assets as well as computer information systems, infrastructures, computer networks, and/or personal computer devices.

It should be further understood that the phrase "physical asset" as used herein generally refers to a wide variety of objects. Thus, in some exemplary embodiments, a physical asset can be a personal object, such as a gadget coupled to a home automation control system, or an automobile incorporating an onboard computer, while in some other exemplary embodiments, a physical asset can be an industrial object such as a power generator, a turbine, a motor, or an engine, each of which includes various stationary parts as well as moving parts. The stationary parts can deteriorate over time for various reasons (such as high temperatures, exposure to elements, and aging) and the moving parts can also deteriorate over time for various such reasons as well as additional reasons such as friction and abrasion. Failure of these parts, particularly moving parts, is generally undesirable as the failure can lead to equipment damage, expensive repairs, and loss of service. Therefore, in traditional practice, certain physical assets can be equipped with monitoring devices that are used to detect parts failures. In some cases, such monitoring devices can provide a warning of an impending part failure. Typically, a margin of tolerance is provided in these monitoring devices so as to avoid false warnings and alarms. This margin of tolerance may allow for a certain level of damage to take place upon a moving part before a warning or alarm is sounded. In some other cases, certain components of a physical asset that are deemed relatively less critical may be left unmonitored for a variety of reasons such as cost, oversight, and a low probability of occurrence of a failure. These components can sometimes fail as well and trigger failures in other non-critical as well as critical parts, sometimes in very unexpected ways.

Unfortunately, such shortcomings in traditional practice can be exploited by malignant entities, via certain types of attacks that can lead to damage to the physical asset. These types of attacks can be specifically designed to go undetected by traditional security measures that are primarily geared towards protecting computers rather than towards protecting one or more physical assets controlled by computers. The typical rationale for protecting computers rather than the physical assets controlled by the computers, is that the physical assets are assumed to be protected as long as the computers that control the operations of these physical assets are protected.

Towards this end, a traditional security system (such as an anti-virus software program) scans various components of a computer (hard drive, registry etc.) in order to detect anomalies in these components and to neutralize any threats if found. However, the anti-virus software program typically does not look for anomalies in say a controller element used by the computer for controlling various operations of a physical asset. As a result of this traditional shortcoming, the controller element can be misappropriated via an intrusion and used to inflict damage upon the physical asset without the traditional security system being aware of the intrusion. In one example scenario, a controller element can be misappropriated via an intrusion in order to modify the speed of a rotary part of a physical asset in a manner that goes undetected by a traditional security system and/or by traditional monitoring devices, and yet leads to significant damage to the rotary part. Similarly, the controller element can be misappropriated via the intrusion in order to allow the temperature of some components of the physical asset to rise and fall in a manner that goes undetected by traditional temperature sensing devices and yet leads to damage to these components as a result of an unacceptable rate/level of temperature cycling.

The various exemplary embodiments disclosed herein can provide systems and methods to protect a physical asset against such types of intrusions.

Figure 1:
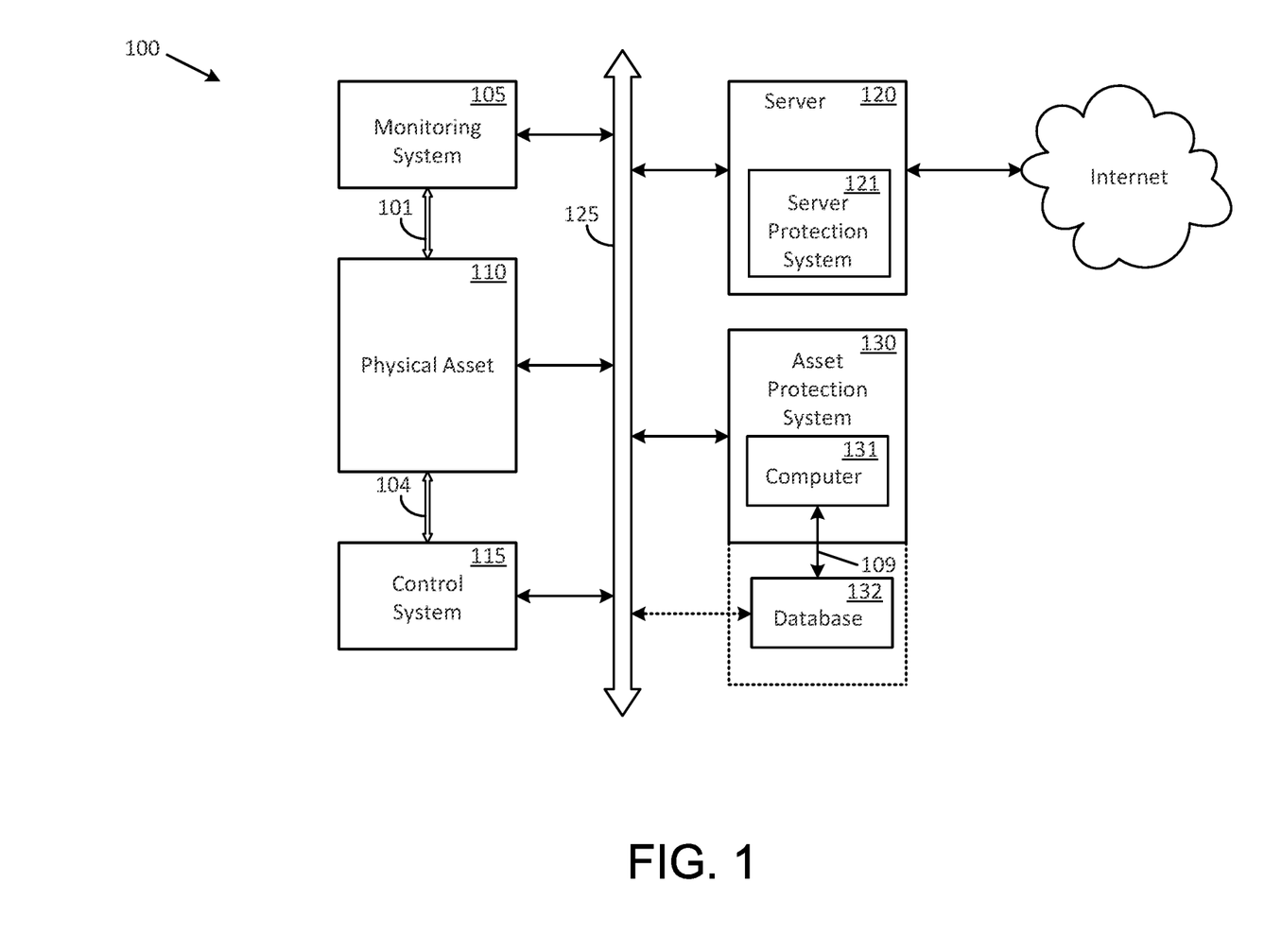
FIG. 1 illustrates an exemplary system that includes an asset protection system communicatively coupled to a physical asset in accordance with an exemplary embodiment of the disclosure.

Attention is first drawn to FIG. 1, which illustrates a system 100 that includes a physical asset 110 and an asset protection system 130 communicatively coupled to the physical asset 110 in accordance with an exemplary embodiment of the disclosure. The physical asset 110 can be one or more of various objects such as a power generator, a turbine, a motor, or an engine. The asset protection system 130 can include a computer 131 that communicates with the physical asset 110 and/or various other elements of the system 100 via a communication bus 125. The communication bus 125 can be part of a local area network (LAN) that includes various components (not shown) such as hubs, switches, and routers.

Also included in the system 100, is a database 132 that can be directly coupled to the asset protection system 130 via a communications link 109, and/or indirectly via the communication bus 125. Furthermore, in one exemplary implementation, the database 132 can be housed along with the asset protection system 130 in a single enclosure and the communications link 109 can be an internal communication link provided inside the enclosure. However, in another exemplary implementation, the database 132 can be housed in a separate enclosure, and the communication link 109 can be an external communication link (such as a wired and/or a wireless link) that communicatively couples the database 132 to the asset protection system 130. The database 132 can be used to store various types of information, including threat signatures that are associated with threats. In some exemplary embodiments, the threat signatures can be used to provide an identification of one or more behaviors of one or more parts of the physical asset 110 when the physical asset 110 is exposed to a threat. For example, a first threat signature can provide an identification of an anomalous rate of change in speed of a rotary part in the physical asset 110, and a second threat signature can provide an identification of an anomalous change in temperature inside the physical asset 110. The database 132 can also be used to store information pertaining to one or more components of the system 100. For example, the database 132 can be used to store mathematical models representing various components of the physical asset 110, interconnectivity information pertaining to various components of the physical asset 110, and/or interaction information that is indicative of the manner in which various components of the physical asset 110 interact with each other and/or with elements external to the physical asset 110. These various mathematical models and other information stored in the database 132 can be used by the computer 131 of the asset protection system 130 to identify one or more anomalous behaviors in the physical asset 110.

The system 100 can further include a control system 115 and a monitoring system 105. The control system 115 can include various control elements in accordance with the nature of the physical asset 110. Thus, for example, when the physical asset 110 is a turbine, the control system 115 can include control elements that provide to the turbine, via the control bus 104, control signals for controlling various operations of the turbine, such as start-up operations, shutdown operations, speed control, thermal control, and so on. The control system 115 can also be coupled to the communication bus 125 in order to communicatively interact with various other elements of the system 100 in addition to the physical asset 110.

The monitoring system 105 can be coupled, via a monitoring bus 101, to various sensor/monitoring elements (not shown) located in the physical asset 110. For example, when the physical asset 110 is a turbine, the various sensors can include one or more of a thermal sensor, a speed sensor, and a fault sensor. The sensors provide sensor signals that typically reflect various performance parameters of the physical asset 110, particularly when the physical asset 110 is operating. The monitoring system 105 can also be coupled to the communication bus 125 in order to communicatively interact with various other elements of the system 100 in addition to the physical asset 110.

A server 120 can be coupled to the communication bus 125 for providing server related services, such as data storage, data services, and Internet connectivity. The Internet connectivity allows for communication between elements of the system 100 (such as the computer 131) and external elements such as one or more client devices provided at a different location. The server 120 can include various components including a server protection system 121 that protects the server 120 from virus attacks.

Figure 2:
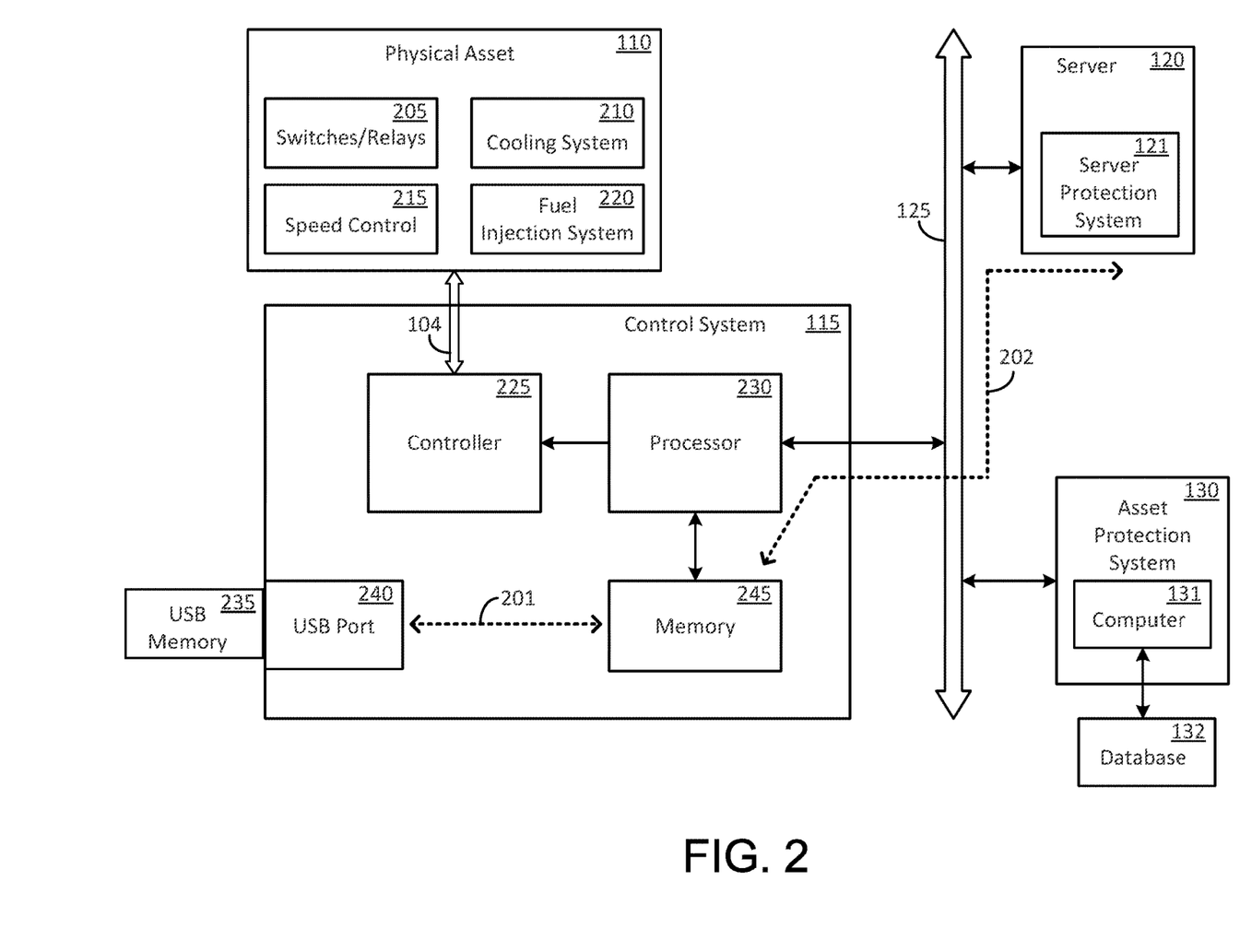
FIG. 2 illustrates a few exemplary types of attacks that can be carried out against the physical asset shown in FIG. 1.

FIG. 2 illustrates a few exemplary types of attacks that can be carried out against the physical asset 110 via the control system 115 of the system 100. A first type of attack against the physical asset 110 can be carried out by introducing malicious software into the system 100 via the Internet. In this type of attack, the malicious software, which is specifically crafted to inflict damage upon the physical asset 110, enters the system 100 from the Internet, through the server 120. As described above, the server 120 includes a server protection system 121. The primary purpose of the server protection system 121 is to protect the server 120 against attacks, and consequently, the server protection system 121 may employ traditional techniques to provide protection to the server 120 against attacks such as spam-mail attacks, phishing attacks, and virus attacks via email attachments. However, the malicious software that enters the system 100 via the server 120 is directed at inflicting damage upon the physical asset 110 and not necessarily upon the server 120 itself. Consequently, the malicious software can be specifically crafted to avoid detection by the server protection system 121 and to propagate into the control system 115 via the dashed line signal path 202 shown in FIG. 2. In order to do this, the malicious software can be disguised as genuine data or hidden inside a system 100 internal message, and propagated over the communication bus 125 and via the processor 230 to the memory 245 of the control system 115.

In many instances, the control system 115 may not include a security system for detecting malicious software as it is presumed that the server 120 will block attacks. Therefore, in accordance with an exemplary embodiment of the disclosure, the asset protection system 130 can be used to monitor the server 120, the communication bus 125, and/or the control system 115, for detecting the attack carried out via the dashed line signal path 202, and for taking measures to protect the physical asset 110 from the attack. In a first example implementation of this embodiment, some or all parts of the asset protection system 130 can be integrated into the server protection system 121 so as to prevent the malicious software from getting past the server 120 and entering the communication bus 125. However, in a second example implementation of this embodiment, some or all parts of the asset protection system 130 can be integrated into the control system 115 so as to detect the malicious software in the control system 115 and prevent the attack from being carried out upon the physical asset 110 via the control system 115.

A second type of attack against the physical asset 110 can be carried out by introducing malicious software directly into the control system 115, thereby bypassing the server 120 and the server protection system 121. The malicious software can be introduced into the control system 115 for example via a disk inserted into a disk drive of the control system 115 or a USB memory stick 235 inserted into a Universal Serial Bus (USB) port 240 of the control system 115. The asset protection system 130, which can be located at least in part, in the control system 115, can monitor the memory 245, the USB port 240, and/or a data path from the USB port 240 to the memory 245 (indicated by the dashed line 201), in order to detect the second type of attack and take measures to protect the physical asset 110 from the attack.

Irrespective of the manner by which the malicious software is introduced into the control system 115, once introduced, the malicious software can modify one or more control signals generated by the controller 225 to inflict damage upon the physical asset 110. In an example attack, the malicious software can configure the controller 225 to modify the operation of a cooling system 210 of the physical asset 110 such that the physical asset 110 is not cooled down when an overheating situation arises thereby causing heat related damage. In the meantime, the malicious software may provide a bogus status report to the server 120 (via the dashed line signal path 202) to indicate that the cooling system 210 has been activated satisfactorily and that the physical asset 110 is operating inside a normal and safe temperature range.

In another example of an attack, the malicious software can configure the controller 225 to modify the operation of a speed control system 215 of the physical asset 110 in a manner that leads to instability and damage to the physical asset 110. The malicious software may provide a bogus status report to the server 120 indicating that the physical asset 110 is operating normally.

In yet another example of an attack, the malicious software can configure the controller 225 to modify the operation of various switches and/or relays (indicated by switches/relays 205) of the physical asset 110 and/or to modify the operation of the fuel injection system 220, so as to create an unsafe operating condition, or to cause a complete shutdown of the physical asset 110.

Figure 3:
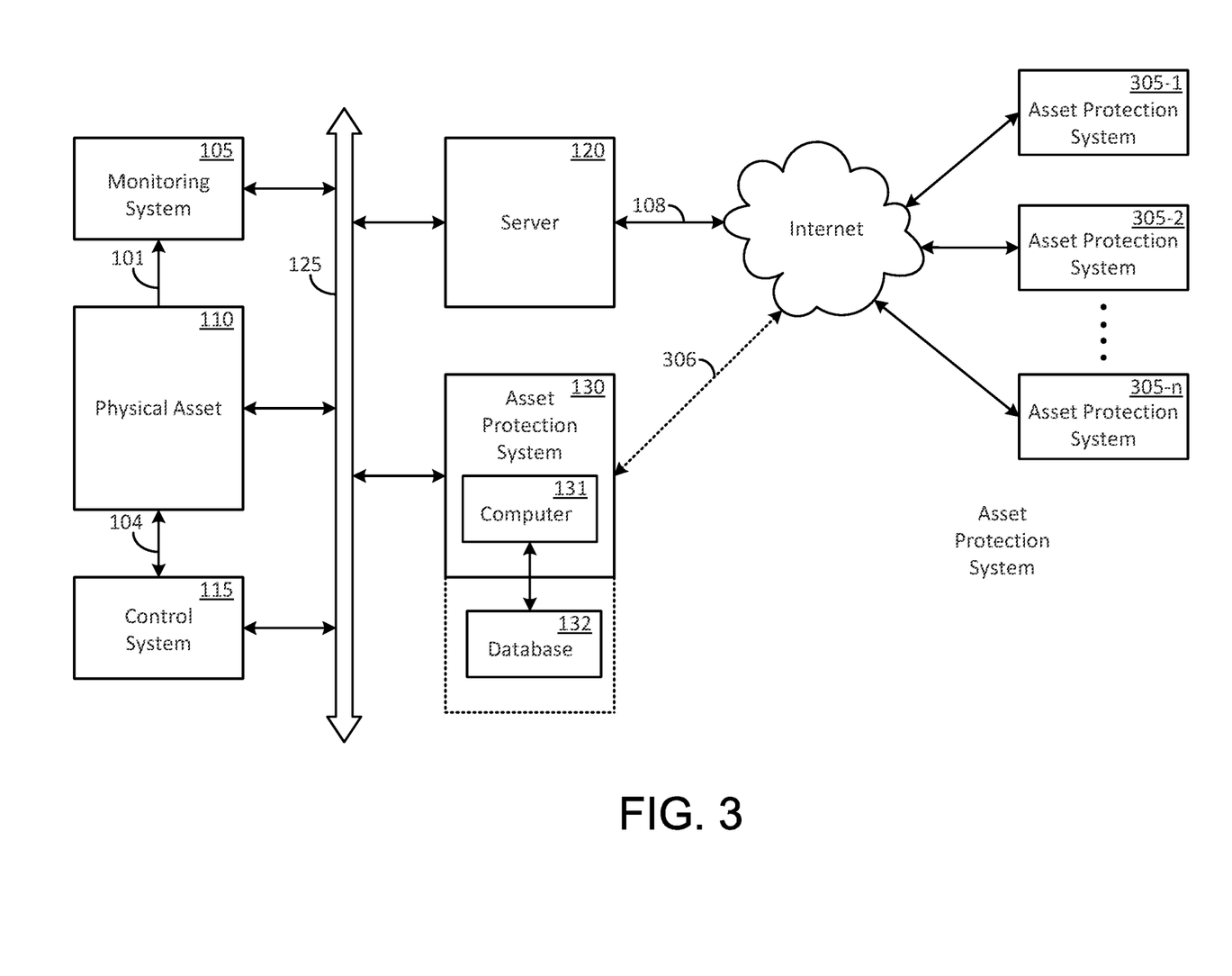
FIG. 3 illustrates an exemplary configuration that can be used to provide threat-related information to an asset protection system in accordance with an exemplary embodiment of the disclosure.

FIG. 3 illustrates an exemplary configuration that can be used to provide threat-related information to the asset protection system 130 in accordance with an exemplary embodiment of the disclosure. In this configuration, the asset protection system 130 is communicatively coupled to "n" (n≥1) asset protections systems 305-*n* via the Internet. One or more of the asset protections systems 305-*n* can be substantially similar in structure to, or different than, the asset protection system 130, and can also include a database substantially similar to, or different than, the database 132. The database 132 can be used to store information pertaining to one or more types of attacks that may have already taken place against one or more of the asset protections systems 305-*n*. Towards this end, the asset protection system 130 can request and obtain information from one or more of the asset protection systems 305-*n* pertaining to some types of attacks that have not yet taken place against the system 100.

The information provided by one or more of the asset protection systems 305-*n* to the asset protection system 130 can include various types of threat signatures associated with threats, such as, a portion of code, a portion of text, a name of an email attachment, a part number/label/identifier of a component of the system 100 used in an attack, a temperature parameter, a temperature-related anomaly, a pressure parameter, a pressure-related anomaly noticed during or prior to an intrusion, a stress parameter, a stress-related anomaly noticed during or prior to an intrusion, a speed parameter, and/or a speed-related anomaly noticed during or prior to an intrusion.

Furthermore, the asset protection system 130 can request and obtain from the asset protections systems 305-*n*, historical information pertaining to strategies used by one or more of the asset protection systems 305-*n* to combat attacks. Some of this historical information can help the asset protection systems 130 to use alternative ways to combat various types of threats against the system 100. Conversely, the asset protection system 130 can provide threat-related information to one or more of the asset protection systems 305-*n*, for assisting one or more of the asset protection systems 305-*n* to protect themselves against a threat of a type that may have been encountered in the system 100.

Figure 4:
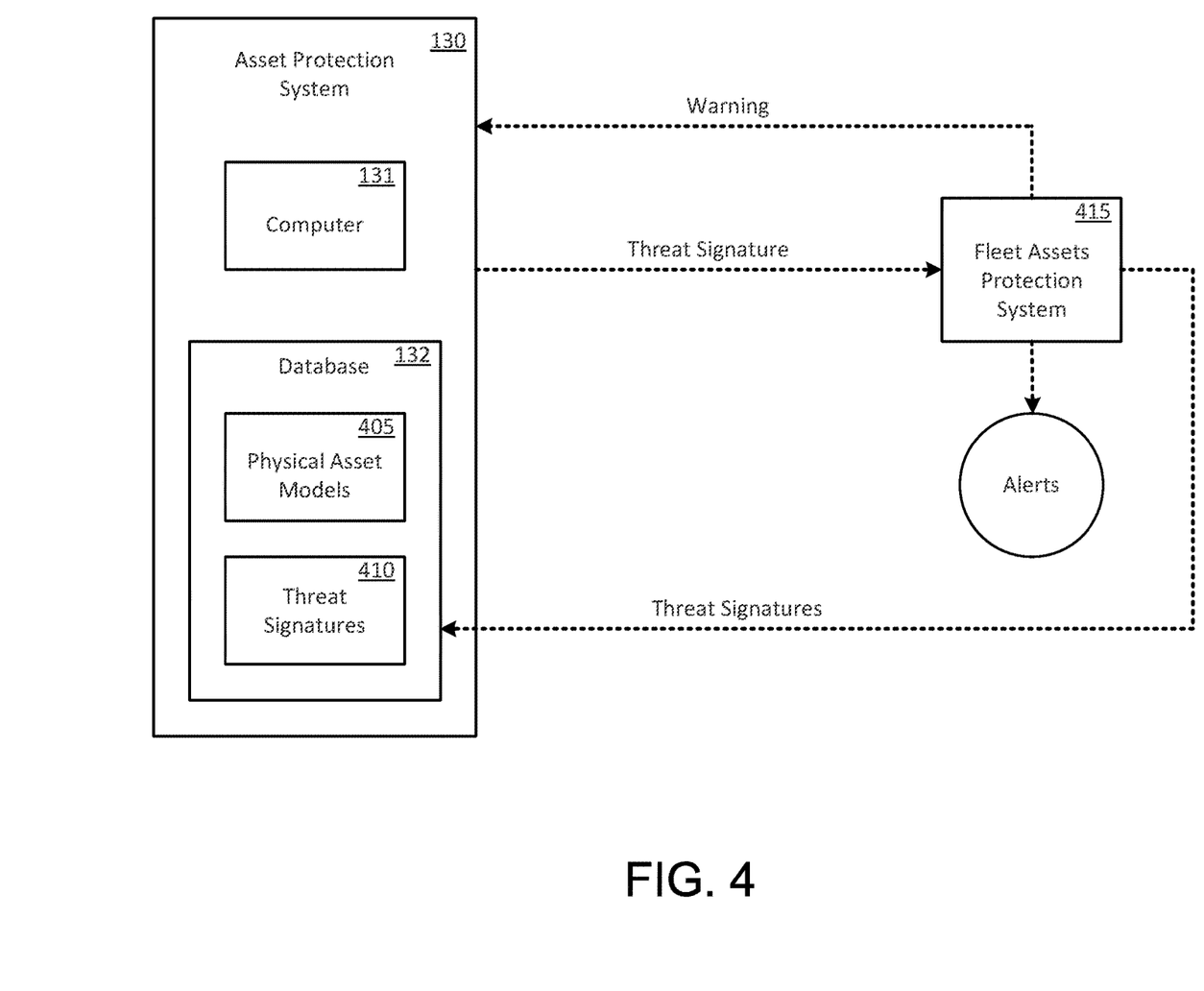
FIG. 4 illustrates another exemplary configuration that can be used to provide threat-related information to an asset protection system in accordance with an exemplary embodiment of the disclosure.

FIG. 4 illustrates another exemplary configuration that can be used to provide threat-related information to the asset protection system 130 in accordance with an exemplary embodiment of the disclosure. In this exemplary configuration, the asset protection system 130 is communicatively coupled to a fleet assets protection system 415 via the Internet. The fleet assets protection system 415 can include one or more databases (not shown) containing information pertaining to various attacks carried out against one or more physical assets in a fleet of physical assets. The fleet of physical assets, which can include the system 100 that is protected by the asset protection system 130, can be geographically spread out and can be centrally protected by the fleet assets protection system 415 in some example implementations. The interaction of the asset protection system 130 with the fleet assets protection system 415 can be a two-way interaction by which the asset protection system 130 can not only obtain threat-related information from the fleet assets protection system 415, but can, in some cases, provide threat-related information to the fleet assets protection system 415 as well.

In one exemplary implementation, the fleet assets protection system 415 can provide to the asset protection system 130, threat-related information in the form of threat signatures such as the exemplary ones described above. The fleet assets protection system 415 can further provide to the asset protection system 130, one or more warnings that may be associated with one or more threat signatures provided by the asset protection system 130 to the fleet assets protection system 415. For example, the fleet assets protection system 415 can use historical information to determine that a particular threat signature provided by the asset protection system 130 to the fleet assets protection system 415 for examination and advice, is of a critical nature. Upon making the determination, the fleet assets protection system 415 can issue a high level warning to the asset protection system 130 for executing preventing measures. The fleet assets protection system 415 can also provide one or more alerts to one or more other asset protection systems (not shown) based on the threat signature provided by the asset protection system 130 to the fleet assets protection system 415 and/or based on other information stored in a database of the fleet assets protection system 415.

Attention is now drawn to some exemplary content that can be stored in the database 132 shown in FIG. 4. The exemplary content can include threat signatures 410 detected by the asset protection system 130, and/or provided to the asset protection system 130 by the fleet assets protection system 415. The exemplary content can further include various physical asset models 405 pertaining to the physical asset 110 (shown in FIG. 1) and/or other physical assets protected by the fleet assets protection system 415. For example, when the physical asset 110 is a turbine, the physical asset models 405 pertaining to the physical asset 110 can include mathematical models representing various operations of the turbine, such as, temperature models, stress models, aging models, failure mode models, and/or operating behavioral models.

Figure 5:
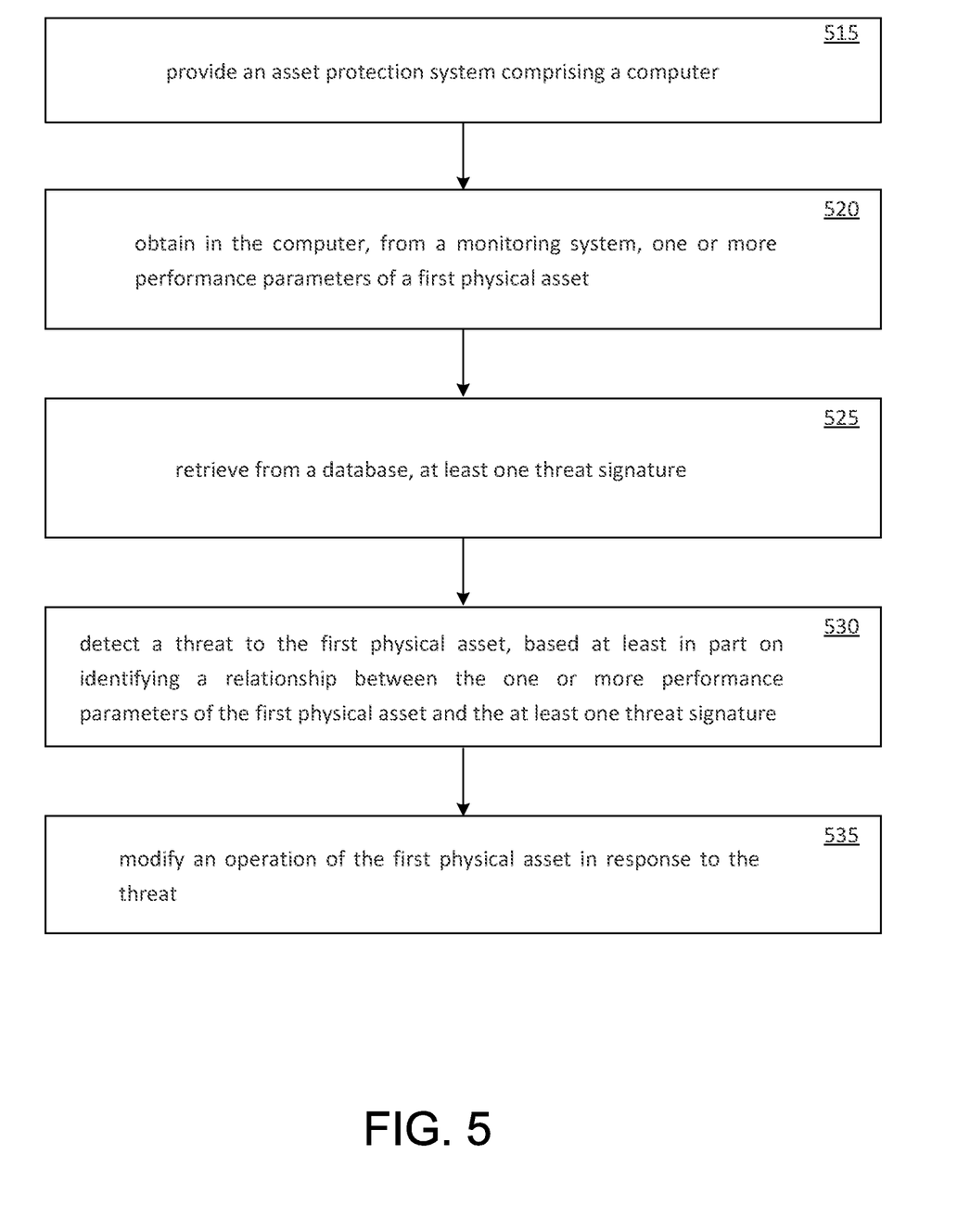
FIG. 5 shows a flowchart of an example method of protecting a physical asset against a threat in accordance with an exemplary embodiment of the disclosure.

FIG. 5 shows a flowchart of an example method of protecting a physical asset against an attack in accordance with an exemplary embodiment of the disclosure. Though applicable to a large variety of systems and physical assets, purely as a matter of convenience, the flowchart shown in FIG. 5 will be described below using various elements and reference numerals shown in FIGS. 1-4.

In accordance with block 515, an asset protection system 130 is provided. The asset protection system 130 can include a computer 131. In the exemplary embodiment shown in FIG. 1, the computer 131 is shown located inside the asset protection system 130. However, it must be understood that some or all parts of the computer 131 can be located in elements other than the asset protection system 130. Thus, for example, in some other exemplary embodiments, a processor of the computer 131 can be provided as a part of at least one of the control system 115, the monitoring system 105, and/or the server 120; and a memory portion of the computer 131 can be provided as a part of at least one of the control system 115, the monitoring system 105, and/or the server 120 as well.

In block 520, one or more performance parameters of a physical asset 110 are obtained in the computer 131 via a monitoring system 105. The performance parameters can include for example, a rate of movement of a moving part (a rotational speed of a rotor for example), a temperature characteristic (absolute temperature reading, rate of change of temperature, and/or temperature differential, for example), and/or a pressure reading.

In block 525, at least one threat signature is retrieved from a database 132. As described above with respect to FIG. 4, various threat signatures can include, for example, a temperature parameter, a temperature-related anomaly noticed during or prior to an attack, a pressure parameter, a pressure-related anomaly noticed during or prior to an attack, a stress parameter, a stress-related anomaly noticed during or prior to an attack, a speed parameter, and/or a speed-related anomaly noticed during or prior to an attack.

In block 530, a threat to the physical asset 110 can be detected based at least in part on identifying a relationship between the one or more performance parameters of the first physical asset 110 and at least one threat signature. In some instances, the threat can be an ongoing attack that is occurring when the relationship between the one or more performance parameters of the first physical asset and the at least one threat signature is being identified.

In block 535, an operation of the first physical asset 110 can be modified in response to the threat. For example, the asset protection system 130 can transmit one or more control signals to the first physical asset 110 directly and/or via the control system 115, to change a rotational speed of a rotary part or to stop the rotary part, when a speed-related anomaly is identified. In one exemplary attack, the speed anomaly can be identified on the basis of a gradual increase in rotational speed of a turbine. Counter-intuitively, in some cases, in response to identifying the increase in rotational speed, the asset protection system 130 can further increase the rotational speed of the turbine because the attack may be specifically based on the premise that a conventional response to an increase in the rotational speed of the turbine would be to quickly decrease the rotational speed of the turbine and/or to shut down the turbine.

In another example, the asset protection system 130 may detect a temperature-related anomaly wherein a temperature of a component that has been subjected to a cooling event appears to be cooling more rapidly than expected. Upon making such a detection, the asset protection system 130 may use a threat signature stored in the database 132 to identify an ongoing attack. The threat signature may indicate that the attack is characterized in part by a bogus status notification transmitted by the monitoring system 105 to the server 120. Accordingly, in block 535, the asset protection system 130 may opt to double check the status notification by configuring the control system 115 to replace a first temperature sensor that is currently active with a second temperature sensor, and to make the monitoring system 105 re-monitor the temperature of the component. The second temperature sensor can be for example, a back-up sensor to the first temperature sensor or a secondary sensor provided specifically for use by the asset protection system 130 to protect the physical asset 110 against such an attack.

Many modifications and other embodiments of the example descriptions set forth herein to which these descriptions pertain will come to mind having the benefit of the teachings presented in the foregoing descriptions and the associated drawings. Thus, it will be appreciated the disclosure may be embodied in many forms and should not be limited to the exemplary embodiments described above. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A system to protect a first physical asset, the system comprising:
   a control system for controlling the first physical asset;
   a monitoring system coupled to the first physical asset, the monitoring system comprising one or more monitoring devices configured to acquire one or more performance parameters of the first physical asset when the first physical asset is placed in an operating condition; and
   an asset protection system comprising a computer, the asset protection system in communication with other asset protection systems protecting respective physical assets, the computer configured to:
      store a mathematical model representing one or more components of the first physical asset, and the interconnectivity of the one or more components of the first physical asset;
      obtain from the one or more monitoring devices, the one or more performance parameters of the first physical asset;
      retrieve from at least one of the other asset protection systems protecting at least one other of the respective physical assets, one or more threat signatures comprising at least one of a rate of change, a rate of movement, a temperature, a pressure, a stress, or a speed of the at least one other of the respective physical assets during or prior to identifying a threat to the first physical asset;
      detect a threat to the first physical asset, based at least in part on the mathematical model identifying a relationship between at least one of the one or more threat signatures and the one or more performance parameters of the first physical asset;
      modify, based at least in part on the threat, operation of the first physical asset by transmitting a control signal via the control system to the first physical asset.

2. The system of claim 1, wherein the one or more threat signatures comprise an identification of one or more behaviors of the first physical asset when the first physical asset is exposed to one or more threats.

3. The system of claim 2, wherein the first physical asset comprises a moving part and wherein the at least a portion of the one or more performance parameters of the first physical asset is indicative of a rate of movement of the moving part.

4. The system of claim 3, wherein the first physical asset is one of a power generator or a turbine.

5. The system of claim 1, wherein the first physical asset is subjected to the threat via the control system.

6. The system of claim 1, wherein the threat comprises a software attack.

7. The system of claim 1, wherein the one or more threat signatures contained in the database are derived from one or more threats carried out upon a second physical asset.

8. The system of claim 7, wherein the second physical asset is substantially similar in structure to the first physical asset.

9. A method to protect a first physical asset, the method comprising:
   providing an asset protection system comprising a computer, the asset protection system in communication with other asset protection systems protecting respective physical assets;
   storing a mathematical model representing one or more components of the first physical asset, and the interconnectivity of the one or more components of the first physical asset;
   obtaining in the computer, from a monitoring system, one or more performance parameters of the first physical asset;
   retrieving from at least one of the other asset protection systems protecting at least one other of the respective physical assets, at least one threat signature comprising at least one of a rate of change, a rate of movement, a temperature, a pressure, a stress, or a speed of the at least one other of the respective physical assets;
   detecting a threat to the physical asset, based at least in part on the mathematical model identifying a relationship between the one or more performance parameters of the first physical asset and the at least one threat signature;

modifying operation of the first physical asset in response to the threat by transmitting a control signal via the control system to the first physical asset.

10. The method of claim 9, further comprising:
generating the one or more threat signatures based on one or more behaviors of a moving part of the first physical asset when the first physical asset is placed in an operating condition and exposed to the threat.

11. The method of claim 9, further comprising:
generating the one or more threat signatures based on one or more behaviors of at least one moving part of a second physical asset.

12. The method of claim 11, wherein the second physical asset is substantially similar in structure to the first physical asset.

13. The method of claim 9, wherein modifying the operation of the first physical asset comprises changing a rate of movement of a moving part of the first physical asset.

14. The method of claim 13, wherein the moving part is a rotary part and wherein changing the rate of movement of the moving part comprises at least one of decreasing a rotational speed of the rotary part, increasing the rotational speed of the rotary part, or stopping the rotary part.

15. The method of claim 9, wherein modifying the operation of the first physical asset comprises at least one of transmitting one or more control signals to the first physical asset via a control system, or transmitting the one or more control signals directly to the first physical asset.

16. The method of claim 9, wherein the threat comprises an ongoing software attack that is occurring when identifying the relationship between the one or more performance parameters of the first physical asset and the at least one threat signature.

17. An asset protection system comprising a computer, the computer configured to:
obtain from a monitoring system, at least one performance parameter of a first physical asset;
store a mathematical model representing one or more components of the first physical asset, and the interconnectivity of the one or more components of the first physical asset;
retrieve from a second asset protection system protecting a second physical asset, at least one threat signature comprising at least one of a rate of change, a rate of movement, a temperature, a pressure, a stress, or a speed of the second physical asset;
detect a threat to the first physical asset, based at least in part on the mathematical model identifying a relationship between the at least one performance parameter of the first physical asset and the at least one threat signature;
modify operation of the first physical asset in response to the threat by transmitting a control signal via the control system to the first physical asset.

18. The asset protection system of claim 17, wherein the first physical asset comprises a moving part and wherein the at least one performance parameter is a rate of movement of the moving part.

19. The asset protection system of claim of claim 18, wherein modifying the operation of the first physical asset comprises modifying the rate of movement of the moving part.

20. The asset protection system of claim of claim 19, wherein the first physical asset is one of a power generator or a turbine.

* * * * *